May 22, 1956   A. T. TOMÁS   2,746,398
AXLE STEERING MECHANISM FOR RAILWAY VEHICLES
Filed Feb. 4, 1954   7 Sheets-Sheet 1
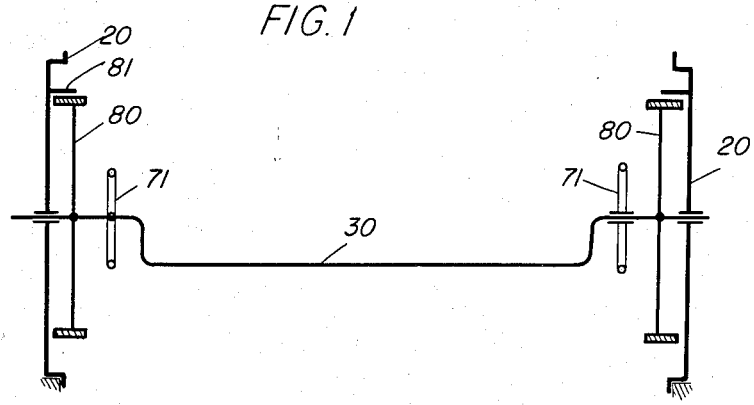
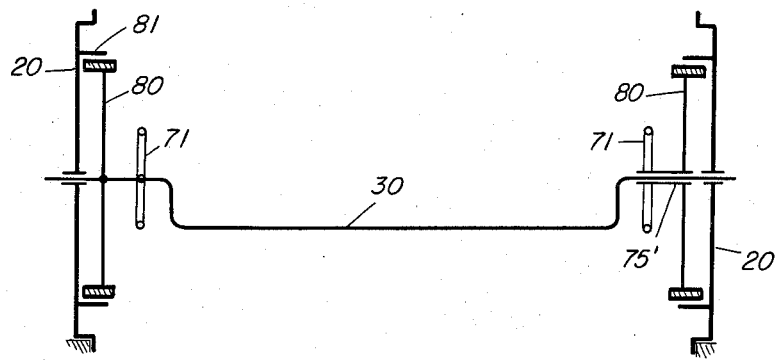
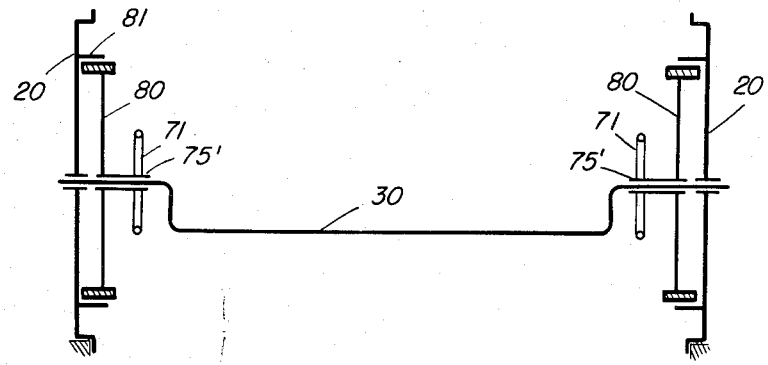
INVENTOR.
Angel Torán Tomás
BY
Byerly, Townsend + Watson
Attorneys May 22, 1956  A. T. TOMÁS  2,746,398
AXLE STEERING MECHANISM FOR RAILWAY VEHICLES
Filed Feb. 4, 1954  7 Sheets-Sheet 2

INVENTOR.
Angel Torán Tomás
BY
Byerly, Townsend & Watson
Attorneys

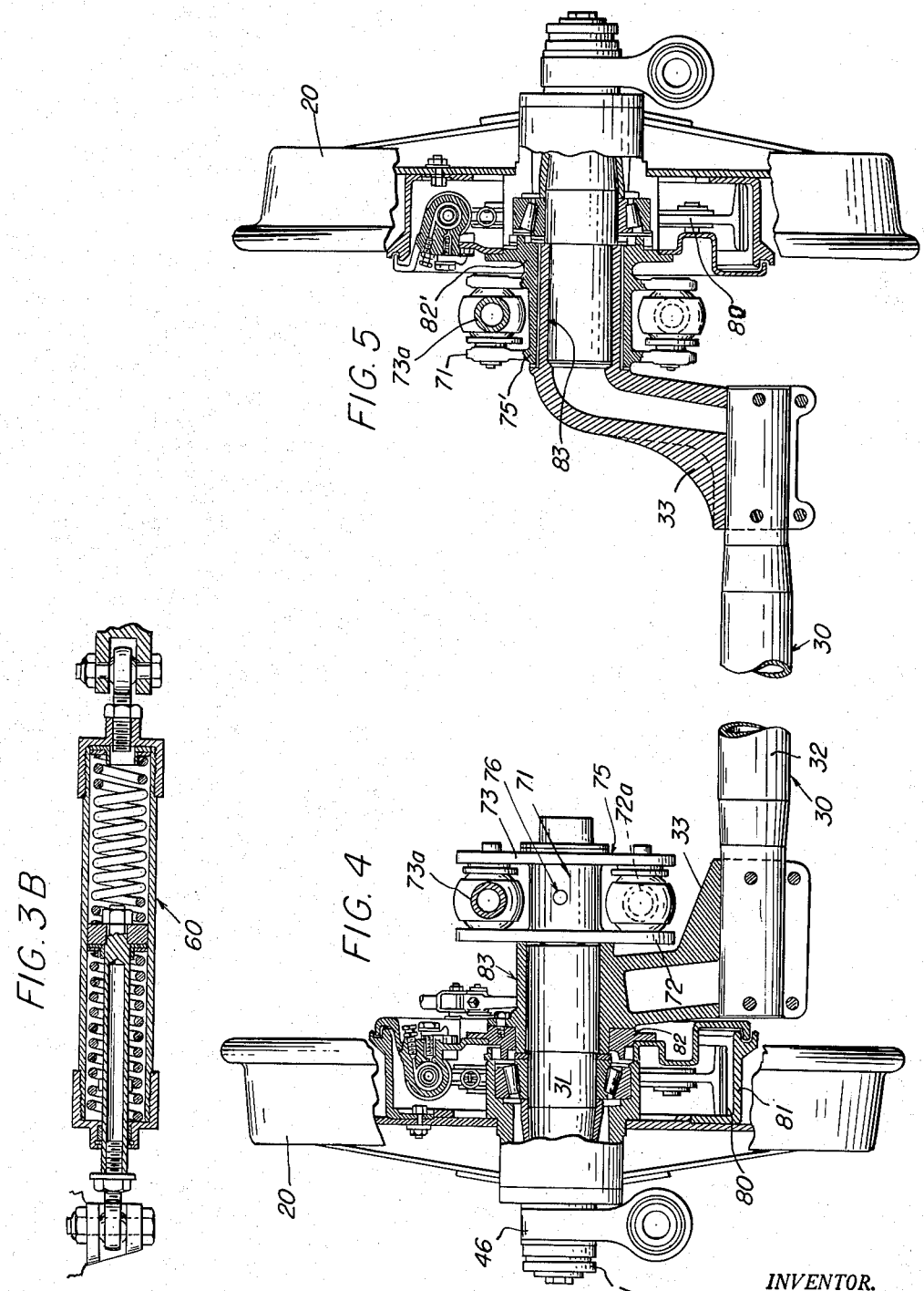

May 22, 1956  A. T. TOMÁS  2,746,398
AXLE STEERING MECHANISM FOR RAILWAY VEHICLES
Filed Feb. 4, 1954  7 Sheets-Sheet 4
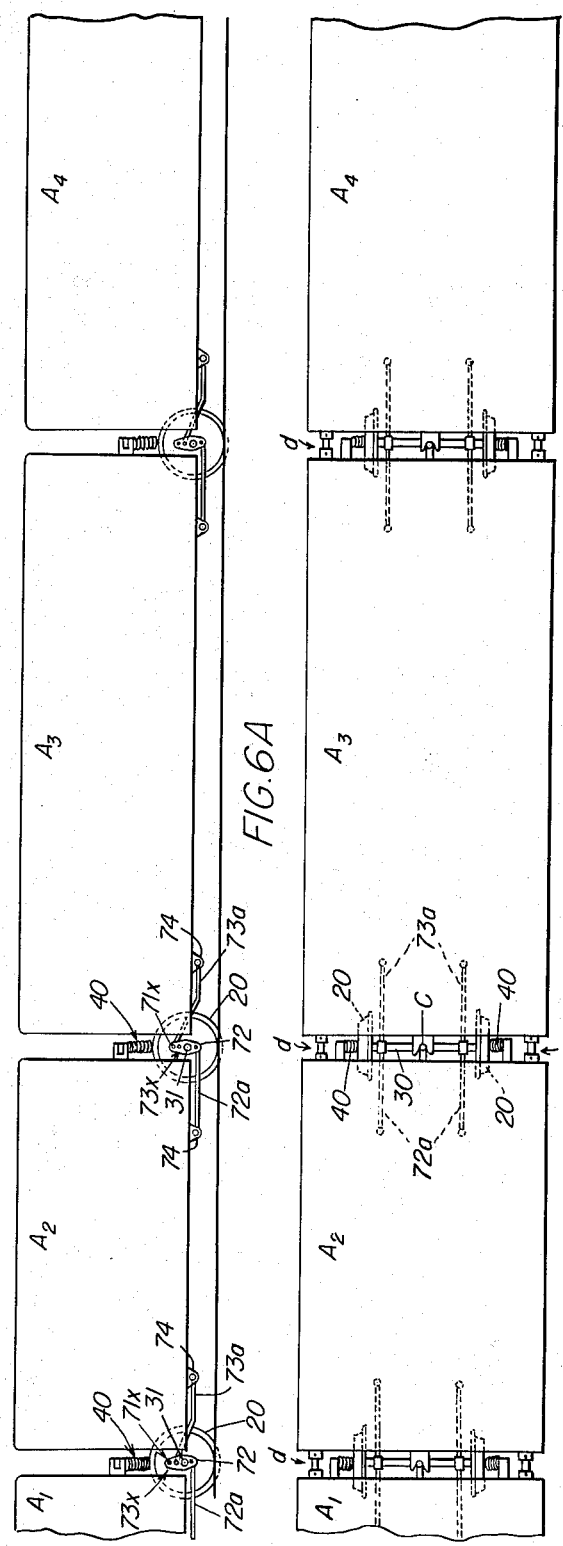
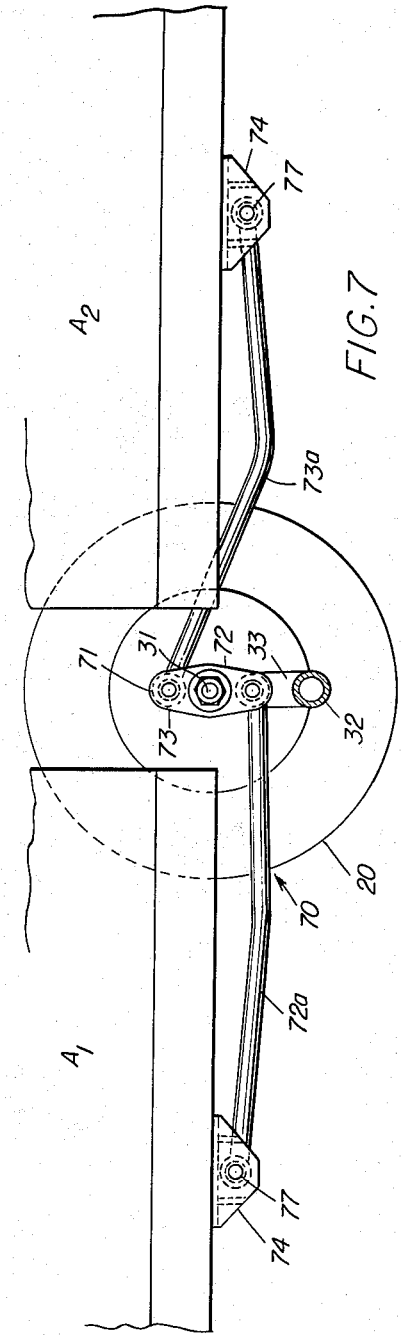
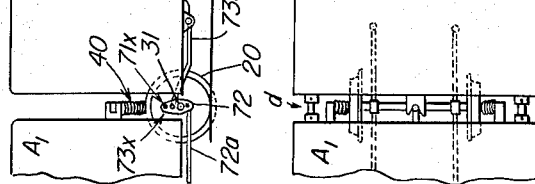
INVENTOR.
Angel Torán Tomás
BY
Byerly Townsend & Watson
Attorneys May 22, 1956

A. T. TOMÁS 2,746,398

AXLE STEERING MECHANISM FOR RAILWAY VEHICLES

Filed Feb. 4, 1954

INVENTOR.
Angel Torán Tomás

BY

Attorneys

May 22, 1956  A. T. TOMÁS  2,746,398
AXLE STEERING MECHANISM FOR RAILWAY VEHICLES
Filed Feb. 4, 1954  7 Sheets-Sheet 6

INVENTOR.
Angel Torán Tomás
BY
Attorneys

May 22, 1956    A. T. TOMÁS    2,746,398
AXLE STEERING MECHANISM FOR RAILWAY VEHICLES
Filed Feb. 4, 1954    7 Sheets-Sheet 7

INVENTOR.
Angel Torán Tomás
BY
Attorneys

United States Patent Office 2,746,398
Patented May 22, 1956

2,746,398
AXLE STEERING MECHANISM FOR RAILWAY VEHICLES

Angel Torán Tomás, Madrid, Spain, assignor to Patentes Talgo, S. A., Madrid, Spain, a corporation of Spain Application February 4, 1954, Serial No. 408,100

6 Claims. (Cl. 105—4)

This invention relates to axle steering mechanism for railway vehicles and constitutes an improvement in the mechanism for that purpose shown in my application Serial No. 233,515, filed June 26, 1951.

The steering mechanism shown in my prior application included a pair of levers of the first class mounted on a dead axle for turning about the axis of wheels which were mounted at the ends of the axle, and bars connecting one end of each lever to the car body in front of the axle and the other end of each lever to the car body behind the axle. The wheels were provided with brakes of the hydraulic type including brake shoes mounted on the dead axle and actuated to engage brake drums carried by the wheels. When the brakes were applied the reaction tended to rotate the whole dead axle about the wheel axis. Such rotation was not resisted by the steering bars since the steering levers to which the bars were attached were turnably mounted on the axle. It was therefore necessary to provide in addition to the steering bars a torque resisting bar connected to one of the car bodies and pivoted to the axle at a point spaced from the axis of the wheels.

In accordance with my present invention the torque resisting bar is eliminated but its function is not eliminated but rather transferred to the steering bars thus producing a simplified apparatus. This is accomplished in accordance with my invention by connecting the brake shoes to one or both of the steering levers so that the braking torque of the shoes is applied to at least one of the steering levers and is resisted by at least two of the steering bars which connect the levers wtih the car bodies.

An important feature of my present invention consists in obtaining the relative turning of the steering levers which is necessary to effect the steering without making both of them rotatable about the dead axle. I have discovered that the relative turning of the steering levers required for steering can be obtained, as a practical matter, when only one of the levers is rotatably mounted on the dead axle while the other lever is fixedly mounted on the axle. This causes the entire dead axle to turn or swing slightly about the axis of the wheels when the lever which is fixed on the axle is turned by the steering bars connected to it when the vehicle rounds a curve. I have found, however, that the turning or swinging of the dead axle caused in this way is of so small an extent that it in no way interferes with either the steering or operation of the spring suspension.

The invention will be explained in connection with the accompanying drawings, in which:

Figs. 1, 2 and 3 are diagrammatic elevations of a pair of wheels mounted on a dead axle showing three different arrangements for applying the braking torque to the steering levers in accordance with my invention;

Fig. 3B is a cross-sectional view of a double-acting spring device which may be used as the centering device;

Fig. 4 is an elevation of a wheel and one end of the axle partly sectioned on the axis of the wheel and showing a steering lever fixed on the axle;

Fig. 5 is a similar view showing the brake shoe connected to a steering lever turnably mounted on the axle;

Figs. 6A and 6B are diagrammatic side and plan views of a portion of an articulated train consisting of two short cars A1, A2 and two long cars A3, A4;

Fig. 7 is a partial side elevation of the connection between two car bodies sectioned on the axis of the train;

Figure 3A:
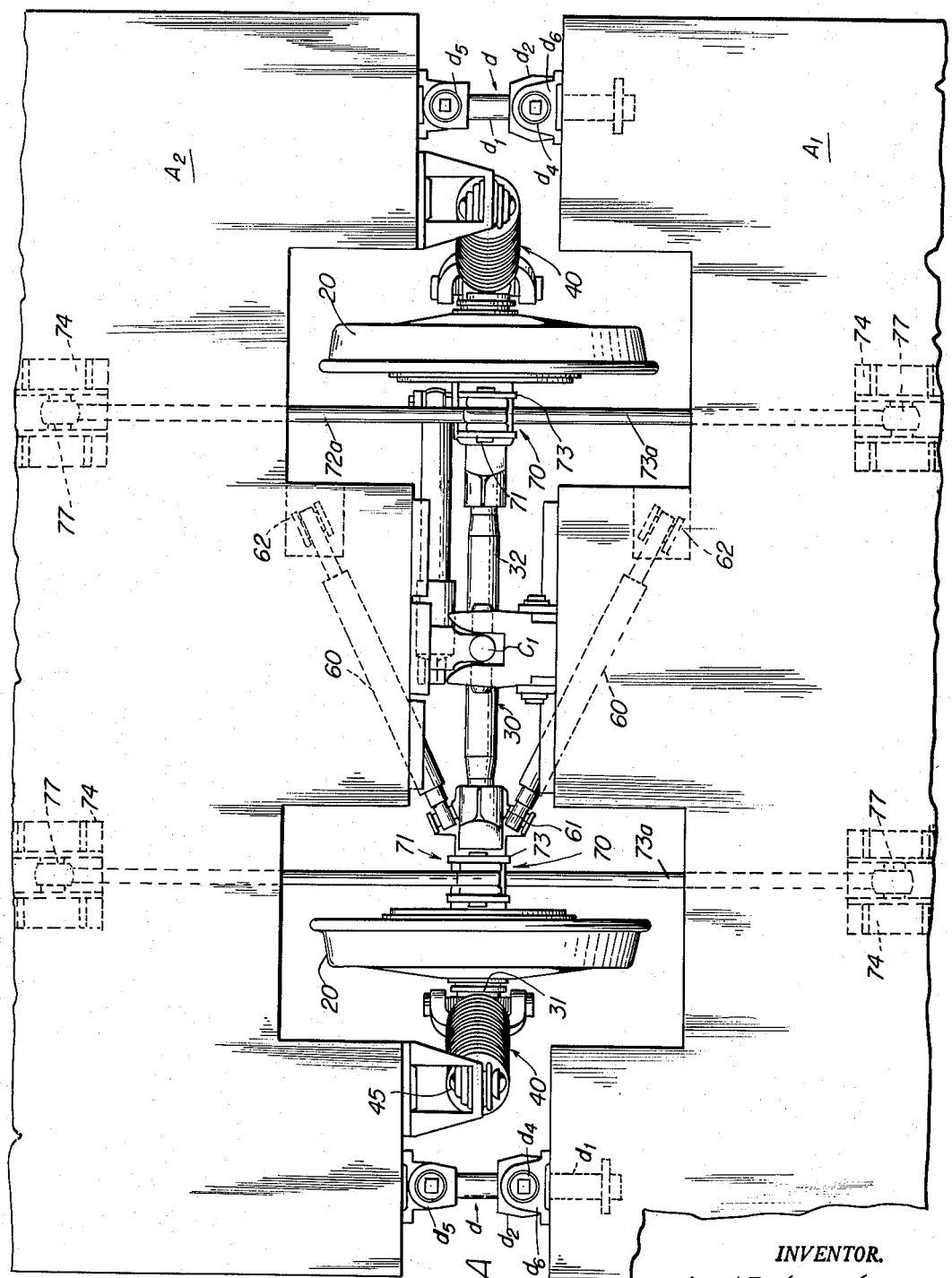
Fig. 3A is a diagrammatic plan view of the dead axle shown in Fig. 3 showing angled centering devices to prevent accidental turning of the axle.

In carrying out my invention, a number of different arrangements may be used to connect the brake shoes with the steering levers.

The simplest arrangement, shown in Fig. 1, requires no modification of the structure shown in my aforesaid application other than the pinning or otherwise fixing to the dead axle 30 of the hub of one of the steering levers 71 to which the steering bars are attached. With this arrangement, the dead axle provides the means for applying the braking torque of the brake shoes 80 of both wheels 20 to the steering lever which is pinned to the axle, so that the steering rods connected to this lever resist the braking torque. This arrangement is entirely satisfactory when a straight dead axle is used instead of the drop-center axle shown in the drawings.

A second arrangement for applying the braking torque to the steering levers, shown in Fig. 2, consists in pinning or fixing one of the steering levers 71 on the dead axle 30 as before and connecting the brake shoe 80 at the other end of the axle with the hub 75' of the steering lever 71 which is turnably mounted on the axle. In this arrangement, the torque of each brake shoe is applied to the steering lever which is adjacent to it, and is resisted by the steering bars adjacent to it, so that the braking does not cause a twisting strain on the axle as in the first arrangement described. The second arrangement is therefor somewhat better than the first when a drop-center axle is used.

In both the arrangements which have been described the steering bars hold a dead axle against all turning, except for the very slight turning of the axle which occurs in steering, so that the central torque resisting bar shown in my prior application may be omitted. The steering bars in addition to resisting the braking torque also perform a safety function which was performed by the central torque bar in my prior application. This safety function consists in preventing rotation of the dead axle in case the bearing of one of the wheels accidentally becomes frozen.

A third arrangement, shown in Fig. 3, for applying the braking torque to the steering levers 71 consists in connecting the brake shoe 80 of each wheel 20 to the hubs 75' of the steering lever adjacent to it, while hubs of both levers are rotatably mounted on the dead axle as in my former application. While this arrangement uses the steering bars effectively to resist the braking torque, it does not provide for using the steering bars to resist an accidental turning of the axle which may be caused by the freezing of a wheel bearing.

With the mounting arrangement shown in Fig. 3, an additional element may be used to prevent accidental turning of the axle. In accordance with my invention, this is accomplished by the use of two angled centering devices 60 as shown in Fig. 3A. Each centering device 60 contains means resiliently opposing either a lengthening or a shortening of the device and also limiting the extent to which the device may be shortened or lengthened. It may consist of a double-acting spring device as shown in Fig. 3B (which is a copy of Fig. 4 of MacVeigh Patent 2,604,857, issued July 29, 1952). Each centering device 60 is attached at one of its ends to a pivot 61 located near one end of the dead axle 30 at the level of the bar 32 of the axle so that it is some distance from the axis of the stub shafts and the wheels mounted on them. The other end of each spring device is pivoted to a bracket 62 on one of the car bodies A-1, A-2. These brackets are positioned so as to incline the spring devices to the axle at equal acute angles.

The two spring devices acting together serve to control and limit lateral movements of the axle. In addition to this primary function, the two spring devices acting in opposition serve to limit fore and aft movements of the part of the axle carrying the pivots 61. As the pivots 61 are located below the axis of the wheels, this limitation of their fore and aft movement serves to limit turning movements of the dead axle about the axis of the wheels.

Illustrative mechanical embodiments of the parts shown diagrammatically in Figs. 1, 2 and 3 are shown in Figs. 4 and 5.

Fig. 4 shows the wheel and associated parts at one end of the dead axle 30. The wheel 20 which is mounted on one end of the stub shaft 31 carries a brake drum 81. Within the drum is a hydraulically-operated brake shoe 80 whose inner portion 82 is fixed on the tubular portion 83 of the elbow 33 in which the stub shaft 31 is mounted. The steering lever 71 has a hub 75 rotatably mounted on the projecting inner end of the stub shaft 31 and secured against rotation with respect to the axle by a pin 76.

Fig. 5 shows a wheel 20 mounted on the dead axle 30 as in Fig. 4. In this case, a tubular member 75' is rotatably mounted on the tubular portion 83 of the elbow 33. The turntable member 75' forms the hub of the steering lever 71 and also carries the inner portion 82' of the brake shoe 80 and may be secured against rotation with respect to the axle by a pin such as the pin 76 as shown in Fig. 4.

To construct the arrangement shown diagrammatically in Fig. 1, the parts shown in Fig. 4 are used at one end of the axle. At the other end, the same parts are used except that the pin 76 is omitted so that the hub 75 of the lever 71 is turnably mounted on the inner end of the stub shaft 31.

In the arrangement shown in Fig. 2, the parts shown in Fig. 5 are used at one end of the axle. At the other end, the same parts are used except that a pin fixes the hub 75' against rotation with respect to the shaft 31.

In the arrangement of Fig. 3, the parts shown in Fig. 5 are used at both ends of the axle.

In order that the use of my invention may clearly be understood, I will describe in detail its incorporation in an articulated railway train of the general type shown in Omar Patent No. 2,462,666.

Figure 8:
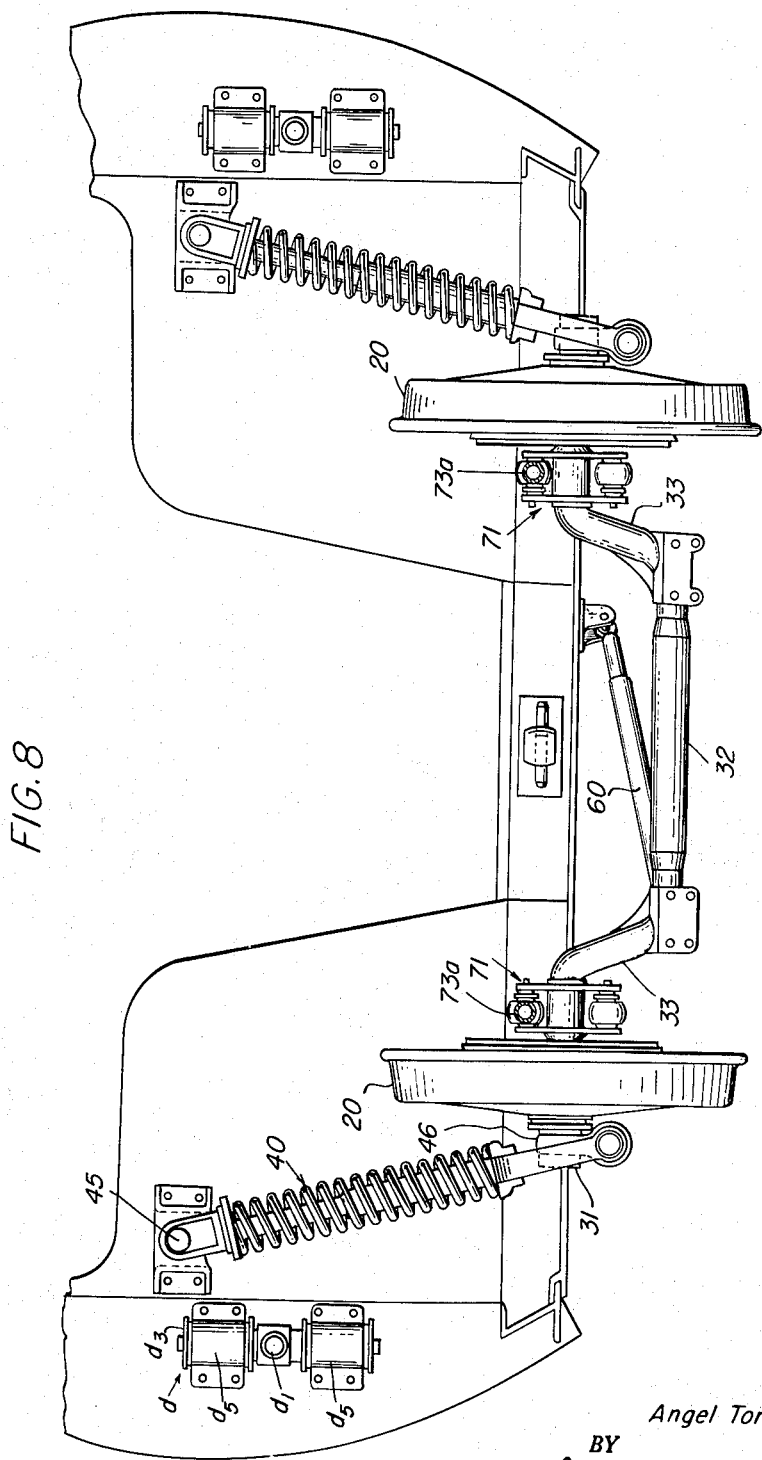
Fig. 8 is an end elevation of one of the car bodies showing the wheel axle and the connections between this axle and the car body.
Figure 9:
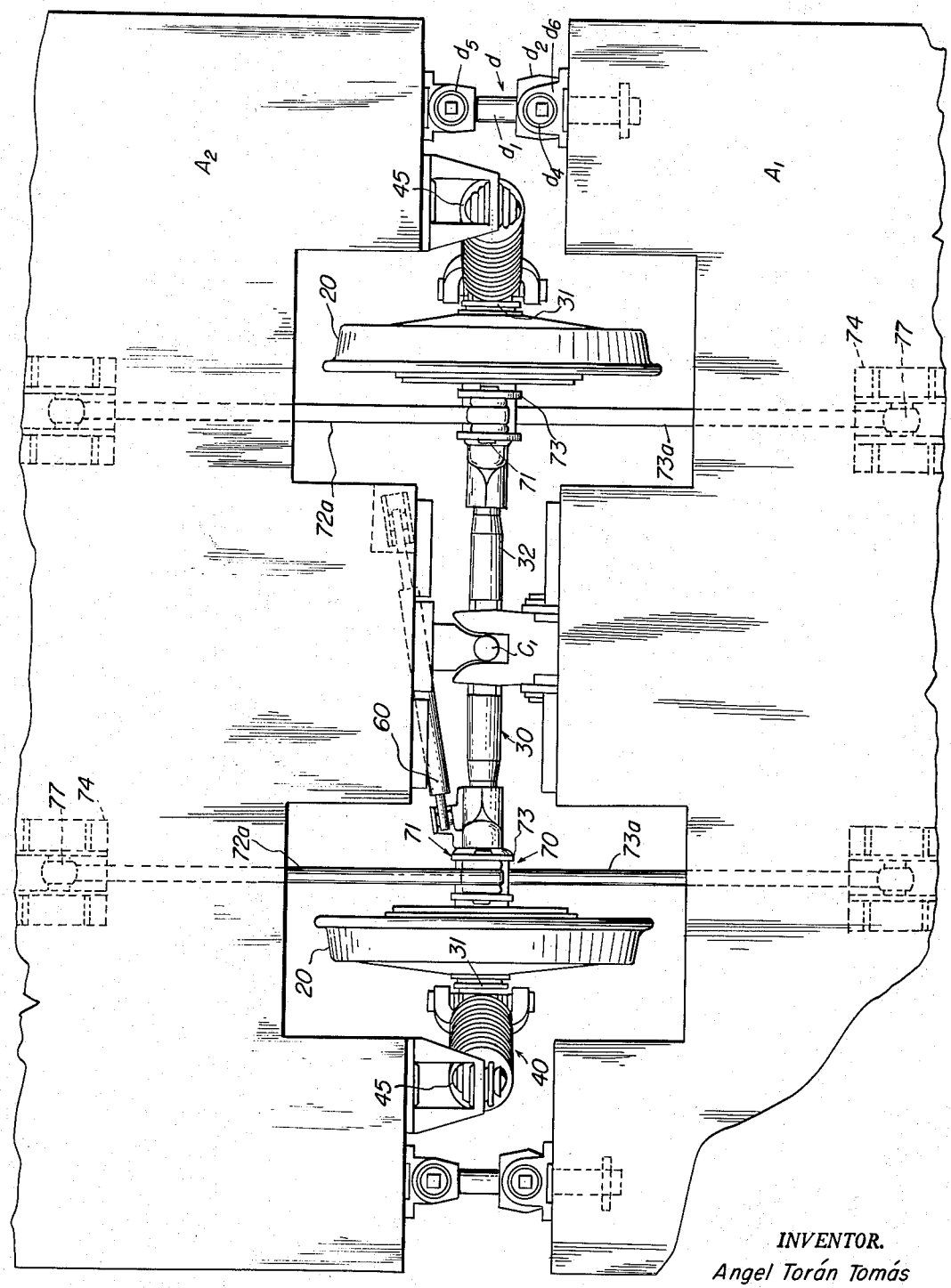
Fig. 9 is a plan view of the wheel axle and its connections to two of the car bodies, the adjacent ends of which are shown diagrammatically.

The articulated train shown in the drawings consists of a number of rigid body sections or car bodies A (specifically identified as A-1, A-2, A-3, etc., where necessary) with traction connections c, each including a vertical pivot $c_1$ (Figs. 6A, 6B, 9). The pivots $c_1$ are the articulation points of the vehicle. The body sections A are aligning by weight-bearing, lateral connections d (Figs. 6B, 8 and 9). The connections d are essentially sliding connections each consisting of a slide element $d_1$ and a guide element $d_2$ in which the slide fits. The slide element $d_1$ is secured to a vertical pivot $d_3$ mounted in vertical bearings $d_5$ attached to the end of one of the sections A. The guide element $d_2$ is attached to a vertical pivot $d_4$ which is mounted in vertical bearings $d_5$ attached to the end of the other section. A pair of wheels 20 is located between adjacent sections near one of the articulation points $c_1$.

The wheels 20 of each pair of wheels are mounted on stub shafts 31 forming part of a dead axle 30. The dead axle 30 is a rigid structure consisting of two stub shafts 31 and a central bar 32 connected by elbow members 33 which serve to offset the stub shafts from the bar 32 (Fig. 8).

The weight of the ends of two articulated sections is supported on the axle 30 by two long, nearly vertical spring struts 40.

Because of the universal joints 45, 46 at their ends, the spring struts 40 leave the axle 30 free to move either laterally or longitudinally. The length of the spring struts is such that small horizontal movements of the axle with respect to the body do not cause appreciable changes in the height of the body above the axle.

Lateral movements of the axle away from a central position in relation to the car structure are restrained and limited by a single centering device 60 as shown in Fig. 9 (except when the mounting arrangement of Fig. 3 is used with two centering devices as shown in Fig. 3A).

The fore and aft movement of the axle 30 which is permitted by the spring struts 40 is controlled by a linkage 70 connecting the axle with both the car bodies between which it is located. This linkage (1) restrains the middle point of the axle against all longitudinal movement with respect to the car bodies so that it always remains in the vertical plane defined by the upper ends of the spring struts 40, and (2) causes such fore and aft movements of the ends of the axle as are needed to maintain the axle always perpendicular to the track (straight or curved) on which the train is running.

Figure 11:
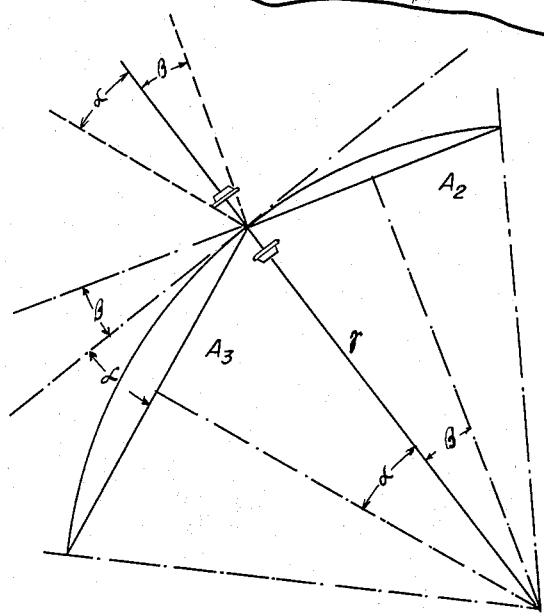
Fig. 11 is a diagram showing the part of the train on a curved track and clearly exaggerating the curvature of the track for the sake of clarity.

Fig. 11 shows diagrammatically the position of two adjacent cars A-2, A-3 of different lengths when the train is on a curved track. In order to maintain the pair of wheels between these cars parallel to the track, the axis of the wheels must be perpendicular to a tangent to the track so that this axis lies at an angle α to a perpendicular to the axis of the longer car A-3 and at a smaller angle β to a perpendicular to the axis of the shorter car A-2. It is evident from the diagram, Fig. 11, that the ratio between the sines of the angles α and β is the same as the ratio between the lengths of the two cars. Since, in practice, the angles α and β will be very small, the ratio between their sines will, as a practical matter, be equal to the ratio between the angles. Thus, the wheels may be kept parallel to the track by positioning their axis so that it lies at angles to perpendiculars to the axes of the two cars which bear the same ratio to each other as the ratio between the lengths of the two cars. This positioning is automatically achieved by the guiding linkage.

The linkage 70 includes two laterally spaced levers of the first class 71 fulcrumed on the axle 30 for relative turning about the axis of the wheels 20. One arm 72 of each lever is connected to one of the car bodies A by bars 72a, while the other arm 73 of each lever is connected to the other car body by bars 73a. The two pairs of bars are normally parallel to the longitudinal axis of the car bodies. They may be bent in vertical planes as shown to avoid interference with fixed parts of the car bodies. They are pivoted to the levers 71 and to brackets 74 secured to the bottoms of the car bodies. While the pivots 77 at the ends of the bars are designed principally to permit turning in a vertical plane, each pivot has a spherical surface permitting freedom of movement in the horizontal plane so that the bars do not prevent slight lateral displacement on the axle.

The bars 72a, 73a are several times the length of the arms, 72, 73 of the levers 71 so that neither lateral nor vertical movements of the car bodies permitted by the spring struts appreciably affect the position of the levers. The ratio of the lengths of the two arms 72, 73 of each lever 71 is equal to the ratio between the lengths of the two car bodies to which they are connected. Thus, when the linkage is between two car bodies A-1, A-2 of equal length, the two arms 72, 73 of each lever 71 are of equal lengths, as shown in Fig. 7; and, when the linkage is between a car body A-3 which has a length 1½ times the length of the car body A-2 as shown in Fig. 6A, the length of the arm 73x of each lever 71x which is connected to the longer car body A*3 is 1½ times the length of the arm 72 of this lever which is connected to the shorter car body A-2, as shown in Fig. 6A. In applying this criterion, the length of each car body is measured between vertical pivots $c_1$ at its two ends.

Figure 10:
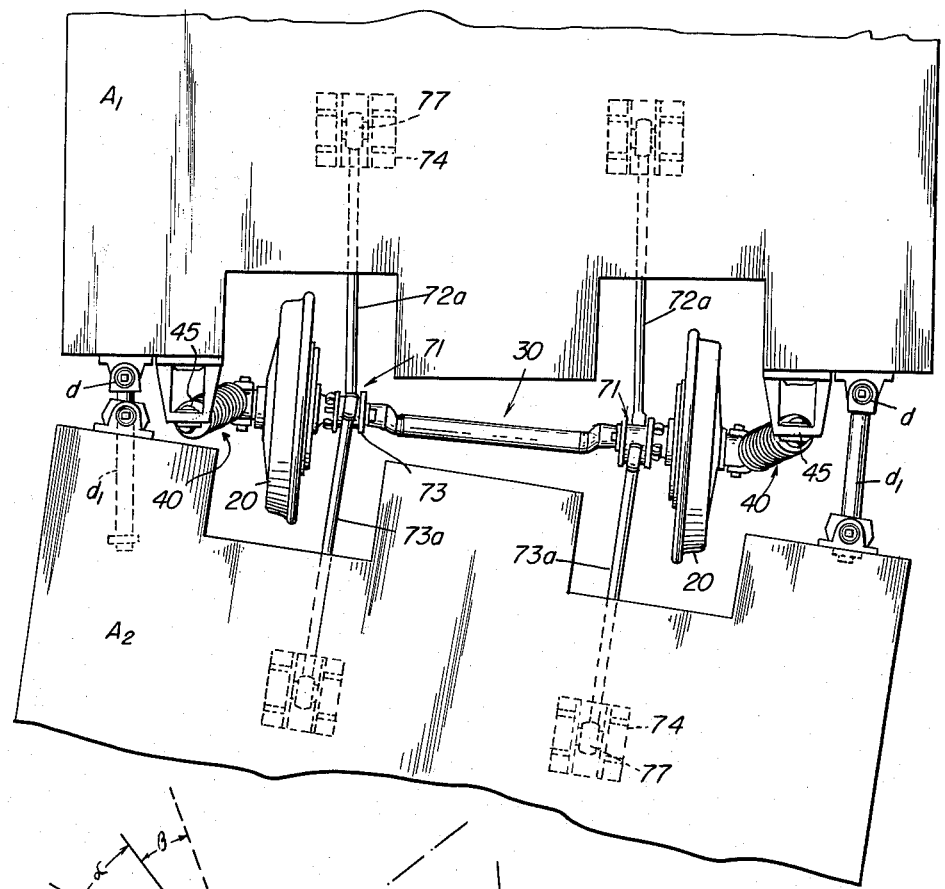
Fig. 10 is a plan view similar to Fig. 4 with parts omitted, indicating the position of the two car bodies and the connecting parts when the train is on a curved track.

The operation of the linkage 70 in steering the axle is as follows:

When the train is on a curved track as shown in Fig. 10, the corners of the sections A-1, A-2 at the outer side of the curve are drawn apart, while those at the inner side of the curve approach each other. At the outer side of the curve, the bars 72a and 73a rotate one of the levers 71 in one direction, while the bars 72a, 73a at the inner side of the curve rotate the other lever 71 in the opposite direction.

As the two levers 71 have the same dimensions and are symmetrically placed, the clockwise rotation of one lever and the anti-clockwise rotation of the other are equal. This results in moving the outer or right-hand end of the axle 30 away from the car body A-1 and moving the left-hand end of the axle toward the car body A-1 by the same amount. As the movements of the two ends of the axle are equal, the middle point of the axle remains in the vertical plane defined by the universal joints at the upper ends of the spring 40.

When one of the levers 71, for example, that at the inner side of the curve, is fixed on the dead axle as shown in Figs. 1 and 2, the entire dead axle turns about the axis of the wheels with this lever so that the lower bar 32 of the axle is swung slightly toward the car body A-2 as indicated in Fig. 10. (This does not occur when both levers are turnably mounted as in Fig. 3). The extent of the turning movement of the levers 71 and of the axle is greatly exaggerated in Fig. 10 for the sake of clearness.

The operation of the linkage 70 in resisting the braking torque has been described.

What I claim is:

1. In a railway vehicle having an articulated body including two pivoted rigid sections and a dead axle and a pair of wheels supporting the adjacent ends of the two sections, an axle steering mechanism comprising two levers of the first class fulcrumed on the axle for relative turning about the axis of the wheels, a brake shoe for each wheel mounted adjacent to the wheel and coaxially therewith, a connection between each brake shoe and at least one of the levers, four bars connecting the levers to the sections as follows: a first bar connecting one arm of one lever to one section, a second bar connecting the other arm of said lever to the other section, a third bar connecting one arm of the other lever to one of the sections and a fourth bar connecting the other arm of this lever to the other section, so that said bars serve to steer the axle and at least two of said bars serve also to resist the torque of the brake shoes.

2. An axle steering mechanism as claimed in claim 1 in which both of the brake shoes and one of the levers are fixed on the dead axle.

3. An axle steering mechanism as claimed in claim 1 in which one of the brake shoes and one of the levers are fixed on the axle, while the other lever and the other brake shoe are turnably mounted on the axle and secured together.

4. An axle steering mechanism as claimed in claim 1 in which both the levers and both the brake shoes are turnably mounted on the axle and each brake shoe is fixed to the lever nearest it.

5. In a railway vehicle having an articulated body including two pivoted rigid sections and a dead axle and a pair of wheels supporting the adjacent ends of the two sections, an axle steering mechanism comprising two levers of the first class fulcrumed on the axle for relative rotation about the axis of the wheels, one of said levers being fixed on the axle and the other being turnably mounted on the axle, four bars connecting the levers to the sections as follows: a first bar connecting one arm of one lever to one section, a second bar connecting the other arm of said lever to the other section, a third bar connecting one arm of the other lever to one of the sections and a fourth bar connecting the other arm of this lever to the other section, so that said bars steer the axle and two of them restrain rotation of the axle about the axis of the wheels.

6. In an axle steering mechanism for a railway vehicle having an articulated body including two pivoted rigid sections and a dead axle and a pair of wheels supporting the adjacent ends of the two sections, the combination of a hub turnably mounted on the axle near one of the wheels, a brake shoe for said wheel secured to said hub, two arms extending from said hub and forming a lever of the first class, and bars connecting the ends of the lever to the two sections.

References Cited in the file of this patent

UNITED STATES PATENTS

| 1,388,508 | Brilhart | Aug. 23, 1921 |
| 2,098,949 | Geissen | Nov. 16, 1937 |
| 2,687,099 | MacVeigh | Aug. 24, 1954 |

FOREIGN PATENTS

| 552,538 | Germany | June 15, 1932 |